US008078591B2

(12) United States Patent
Rapp

(10) Patent No.: US 8,078,591 B2
(45) Date of Patent: Dec. 13, 2011

(54) METHODS, SYSTEMS AND COMPUTER APPLICATIONS FOR REAL TIME DATA PROCESSING

(75) Inventor: Roman Rapp, Antibes (FR)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/382,914

(22) Filed: Mar. 26, 2009

(65) Prior Publication Data
US 2009/0210420 A1    Aug. 20, 2009

Related U.S. Application Data

(63) Continuation of application No. 11/060,749, filed on Feb. 18, 2005, now Pat. No. 7,529,749.

(30) Foreign Application Priority Data

Feb. 19, 2004  (EP) .................................... 04003697

(51) Int. Cl.
  *G06F 7/00* (2006.01)
  *G06F 17/00* (2006.01)
(52) U.S. Cl. ........ 707/687; 707/704; 710/200; 711/147; 711/150; 711/167; 711/168
(58) Field of Classification Search .................. 707/704, 707/781, 999.8, 687, 999.008; 710/200; 711/147, 150, 167, 168
See application file for complete search history.

(56) References Cited

U.S. PATENT DOCUMENTS

| 4,716,528 A | 12/1987 | Crus et al. |
| 5,119,490 A | 6/1992 | Kurose |
| 5,327,556 A | 7/1994 | Mohan et al. |
| 5,414,839 A | 5/1995 | Joshi |
| 5,440,732 A | 8/1995 | Lomet et al. |
| 5,485,607 A | 1/1996 | Lomet et al. |
| 5,551,046 A | 8/1996 | Mohan et al. |
| 5,721,943 A | 2/1998 | Johnson |
| 5,893,157 A * | 4/1999 | Greenspan et al. ........... 711/150 |
| 5,983,225 A | 11/1999 | Anfindsen |

(Continued)

FOREIGN PATENT DOCUMENTS

EP    1 566 744    8/2005

(Continued)

OTHER PUBLICATIONS

Bodorik et al., "Locking with different granularities for reads and writes in an MVM system", IEEE, Database Engineering and Applications, 1999. pp. 320-330. Download: http://ieeexplore.ieee.org/stamp/stamp.jsp?arnumber=787281&tag=1.*

(Continued)

*Primary Examiner* — Hares Jami

(74) *Attorney, Agent, or Firm* — Finnegan, Henderson, Farabow, Garrett & Dunner LLP

(57) ABSTRACT

Methods, systems and software applications are provided for real time data processing. In one implementation, a method is provided for locking data objects in a computer system. The method may comprise determining whether a number of lock objects to be locked is less than or equal to a maximum number of lock objects; creating, when the number is less than or equal to the maximum, one or more lock objects comprising names and values for key fields; and creating, when the number is greater than the maximum, one or more lock objects by applying a heuristic process such that the lock objects include wild cards for key fields.

18 Claims, 3 Drawing Sheets

U.S. PATENT DOCUMENTS

| | | | |
|---|---|---|---|
| 6,047,283 A * | 4/2000 | Braun | 707/999.003 |
| 6,144,983 A | 11/2000 | Klots et al. | |
| 6,216,207 B1 | 4/2001 | Miller et al. | |
| 6,405,274 B1 | 6/2002 | Chan | |
| 6,418,438 B1 | 7/2002 | Campbell | |
| 6,556,994 B1 * | 4/2003 | Zheng et al. | 707/999.008 |
| 6,631,366 B1 | 10/2003 | Nagavamsi et al. | |
| 6,772,155 B1 | 8/2004 | Stegelmann | |
| 6,826,570 B1 | 11/2004 | Eshel et al. | |
| 7,206,794 B2 | 4/2007 | Rapp | |
| 7,254,578 B2 | 8/2007 | Devarakonda et al. | |
| 7,328,263 B1 * | 2/2008 | Sadjadi | 709/225 |
| 7,487,152 B1 | 2/2009 | Uceda-Sosa et al. | |
| 7,529,749 B2 | 5/2009 | Rapp | |
| 2002/0099703 A1 | 7/2002 | Whang et al. | |
| 2003/0004945 A1 | 1/2003 | Teng et al. | |
| 2003/0093457 A1 | 5/2003 | Goldick | |
| 2004/0133652 A1 | 7/2004 | Miloushev et al. | |
| 2004/0148447 A1 | 7/2004 | Conrad et al. | |
| 2004/0186825 A1 | 9/2004 | Dettinger et al. | |
| 2004/0187121 A1 | 9/2004 | Barth et al. | |
| 2004/0199512 A1 * | 10/2004 | Cornwell et al. | 707/9 |
| 2004/0221079 A1 * | 11/2004 | Goldick | 710/200 |
| 2006/0123004 A1 | 6/2006 | Rapp | |
| 2006/0136637 A1 | 6/2006 | Goldick | |
| 2007/0118523 A1 | 5/2007 | Bresch et al. | |
| 2007/0299814 A1 | 12/2007 | Barsness et al. | |
| 2008/0082534 A1 | 4/2008 | Eigmeann et al. | |
| 2008/0189240 A1 | 8/2008 | Mullins et al. | |
| 2009/0210420 A1 | 8/2009 | Rapp | |

FOREIGN PATENT DOCUMENTS

| | | |
|---|---|---|
| EP | 1 566 751 | 8/2005 |
| WO | WO 2004/025504 | 3/2004 |

OTHER PUBLICATIONS

Chakrabarti et al., "Dynamic granular locking approach to phantom protection in R-trees", IEEE, Data Engineering, 1998. Proceedings., 14th International Conference, 1998. pp. 454-463. Downlaod: http://ieeexplore.ieee.org/stamp/stamp.jsp?arnumber=655807.*

European Search Report, issued on May 18, 2005, in related European Application No. 05100632.8 (4 pages).

Rosier et al., "Deadlock resolution and semantic lock models in object-oriented distributed systems and deadlock resolution", Proceedings of the 1988 ACM SIGMOD international conference on Management of data table of contents, pp. 361-370. Download: http://delivery.acm.org/10.1145/60000/50246/p361-roesler.pdf?key1=50246&key2=624523822&coll=ACM&dl=ACM&CFID=13205.

"The SAP Lock Concept", Release 4.6C, SAP AG, published Apr. 2001, pp. 1-37. Download: http://help.sap.com/printdocu/core/Print46c/EN/data/pdf/BCCSTEQ/BCCSTEQ_PT.pdf.

Anonymous, "ABAP Programmierung (BC-ABA) Release 4.6C," SAP Software Documentation, [Online] Apr. 2001, pp. 1-16, and 1359-1391; retrieved from the Internet: URL:http://help.sap.com/printdocu/core/Print46c/de/data/pft/BCABA/BCADA.pdf, retrieved on Mar. 7, 2006, Document No. XP-002370919.

Anonymous, "BC—ABAP Dictionary Release 4.6C," SAP Software Documentation, [Online] Apr. 2001, pp. 1-8, and 214-230; retrieved from the Internet: URL:http://help.sap.com/printdocu/core/Print46c/de/data/pdf/BCDWBDIC/BCDWBDIC. pdf, retrieved on Mar. 7, 2006, Document No. XP-002370918.

Anonymous, "Das SAP Sperrkonzept (BC-CST-EQ) Release 4.6C," Publication of SAP AG, [Online] Apr. 2001, pp. 1-38; retrieved from the Internet: URL:http://www.consolut.de/saphelp/deutscha/BCCSTEQ/BCCSTEQ—PT.pdf, retrieved on Apr. 6, 2006, Document No. XP7900140.

Bernstein et al., "Concurrency Control and Recovery in Database Systems, Two Phase Locking," Concurrency Control and Recovery in Database Systems, Reading, Addison Wesley, US, pp. 47-111, 1987, Document No. XP002270716.

EPO Communication and Search Report, dated Jul. 5, 2005, from EPO Application EP 05100456 (8 pages).

EPO Communication and Search Report, dated Jun. 15, 2005, from EPO Application EP 05100460 (8 pages).

Gray et al., "Transaction Processing Concepts and Techniques (excerpt), Passage," Transaction Processing: Concepts and Techniques, pp. 373-445, 1993, Document No. XP002322153.

Mohan, C., "Interactions Between Query Optimization and Concurrency Control," Research Issues on Data Engineering, 1992: Transaction and Query Processing, 2nd Int'l Workshop, Tempe, AZ, Feb. 2-3, 1992, IEEE Computer Society, Feb. 2, 1992, pp. 26-35.

Notice of Allowance dated Dec. 29, 2008 in U.S. Appl. No. 11/060,749.

Office Action dated Jun. 25, 2008 in U.S. Appl. No. 11/060,749.

Office Action dated Oct. 18, 2007 in U.S. Appl. No. 11/060,749.

PCT International Search Report and Written Opinion for PCT/EP2005/056483 dated Mar. 24, 2006 (12 pages).

PCT International Search Report and Written Opinion for PCT/EP2005/056484 dated Mar. 14, 2006 (14 pages).

Read et al., "Die SAP Architektur," SAP Datenbank-Administration MIT Microsoft SQL Server 2000, Galileo Press, 2002, pp. 19-42.

Anonymous, "ABAP Programmierung (BC-ABA) Release 4.6C," SAP Software Documentation, [Online] Apr. 2001, pp. 1-16, and 1359-1391; retrieved from the Internet: URL:http://help.sap.com/printdocu/core/Print46c/de/data/pft/BCABA/BCADA.pdf, retrieved on Mar. 7, 2006, Document No. XP-002370919 (Translation submitted).

Anonymous, "BC—ABAP Dictionary Release 4.6C," SAP Software Documentation, [Online] Apr. 2001, pp. 1-8, and 214-230; retrieved from the Internet: URL:http://help.sap.com/printdocu/core/Print46c/de/data/pdf/BCDWBDIC/BCDWBDIC. pdf, retrieved on Mar. 7, 2006, Document No. XP-002370918 (Translation submitted).

Anonymous, "Das SAP Sperrkonzept (BC-CST-EQ) Release 4.6C," Publication of SAP AG, [Online] Apr. 2001, pp. 1-38; retrieved from the Internet: URL:http://www.consolut.de/saphelp/deutscha/BCCSTEQ/BCCSTEQ—PT.pdf, retrieved on Apr. 6, 2006, Document No. XP7900140 (Translation submitted).

* cited by examiner

METHODS, SYSTEMS AND COMPUTER APPLICATIONS FOR REAL TIME DATA PROCESSING

This is a continuation of application Ser. No. 11/060,749 filed Feb. 18, 2005 now U.S. Pat. No. 7,529,749, which claims the benefit of priority from European Patent Application No. 04003697.2, filed Feb. 19, 2004, the disclosures of which are incorporated by reference herein in their entirety.

BACKGROUND

1. Field of the Invention

The present invention generally relates to electronic data processing. More particularly, the invention relates to methods, systems and computer applications for data processing, including data locking.

2. Background Information

A database management system is usually equipped with a special lock mechanism that synchronizes access to data on the database. The purpose of the lock mechanism is to prevent two transactions from changing the same data on the database simultaneously.

Locks may be defined generically as "lock objects". A lock entry is a specific instance of a lock object and locks a certain database object, such as a correction or a table entry or a file or a whole table.

Locks are usually set and deleted automatically when user programs access a data object and release it again.

When interactive transactions are programmed, locks may be set and released by calling specific function modules.

The tables in which data records should be locked with a lock entry are defined in a lock object together with their key fields. When tables are selected, one table (the primary table) is first selected. Further tables (secondary tables) can also be added using foreign key relationships.

The lock argument of a table in the lock object may consist of the key fields of the table. The lock argument fields of a lock object may be used as input parameters in the function modules for setting and removing locks generated from the lock object definition. When these function modules are called, the table entries to be locked or unlocked are specified by defining certain values in these fields. These values can also be generic or wildcards. The lock argument fields therefore define which subset of the table entries should be locked.

A simple case of a lock object consists of exactly one table and the lock argument of the table is the primary key of this table. Several tables can also be included in a lock object. A lock entry, therefore, can lock an entire logical object, and not only a record of a table. Such a logical object can be, for example, a document comprising an entry in a header table and N entries in a position table.

Furthermore, a lock mode may be assigned for each table in the lock object. A lock mode may define how other users can access a locked record of the table.

The lock mode controls whether several users can access data records at the same time. The lock mode can be assigned separately for each table in the lock object. When the lock is set, the corresponding lock entry is stored in the lock table of the system for each table.

Access by more than one user can be synchronized in the following ways:

Exclusive Lock: The locked data can only be displayed or edited by a single user. A request for another exclusive lock or for a shared lock is rejected.

Shared Lock: More than one user can access the locked data at the same time in display mode. A request for another shared lock is accepted, even if it comes from another user. An exclusive lock is rejected.

Exclusive But Not Cumulative: Exclusive locks can be requested several times from the same transaction and processed successively. In contrast, exclusive but not cumulative locks can be called only once from the same transaction. All other lock requests are rejected.

It is possible to synchronize access by several programs to the same data with a logical lock mechanism having two main functions: (i) a program can tell other programs which data records it is just reading or changing; and (ii) a program can prevent itself from reading data that is just being changed by another program.

Data records of a table to be locked may also be defined by a logical condition. When a lock is set, this logical condition is entered in a lock table. This entry is retained until it is removed by the program or the program comes to an end. All of the locks set by a program are thus removed at the end of the program.

When accessing data records, the records just being edited by other programs may be identified by the entry in the lock table. Such an entry for the lock may define a number of fully specified key fields. That is, either a value is passed for the key field or this field is locked generically by means of a wildcard.

In a multi-user system environment, as is frequently the case in enterprise business software and computer systems, data that is being processed by one user has to be locked, so that another user can not change it at the same time. This is essential to avoid data inconsistencies.

Usually, the data is locked via the key of the processed data (e.g., document number, cost center ID). However, business transactions that process a lot of data at the same time (e.g., the costing of a car with several thousand components, or the evaluation of a value flow net between many cost centers, activities and cost objects) can not lock every single piece of data via its key, since the number of locks that can be set is restricted due to limited hardware resources. For instance, a reasonable number of locks per transaction may be around 50 for larger multi-user systems. Anything more could harm the performance of the system. This is especially true, if several hundreds or thousands of users work at the same time setting locks in the system.

Thus, as stated above, mass transactions can not lock every single piece of data (e.g., every product number or every cost center ID). Instead, wildcards can be used in a lock entry so that it affects several single keys and many pieces of data can be locked via one entry. By way of example, U.S. Pat. No. 6,047,283 discloses a lock mechanism, in which a dynamic lock table is used for managing the collision of lock requests of several users accessing a database, for instance, by means of wildcards.

However, wildcards have to be used with care. Otherwise, too much data will be locked and other users will not be able to continue with their tasks, since they can't access needed data. For example, during the calculation of a product with 100 sub-products, one can not lock all products by only having a wildcard in the lock entry for product. Otherwise, a second user could not run a costing of an independent product.

Thus, there is a need for methods, systems and software applications that provide an efficient solution to at least part of the problems described above. Moreover, it is desirable to provide a method, system or software application having a mechanism for using wildcards in data locking more efficiently.

The above description is based on the knowledge of the present inventors and not necessarily that known in the art.

SUMMARY

In view of the foregoing, methods, systems and computer applications are provided for data locking. Such methods, systems and computer applications may overcome one or more of the drawbacks mentioned above, consistent with embodiments of the invention.

In accordance with one embodiment, a method is provided for locking data objects in a computer system, the method comprising receiving, with a lock service module, a request from a first processing module to lock one or more (n) data objects for access for further data processing modules by creating one or more lock objects for the one or more data objects. The method may further comprise: receiving, with the lock service module, names of one or more (m) key fields of the one or more data objects to be locked; receiving, with the lock service module, n values for each of the m key fields of n data objects to locked; receiving, with the lock service module, a maximum number (k) of locks to lock the n data objects; checking, with the lock service module, whether n<=k and, in case yes, creating one or more lock objects comprising the m names and n values for the m key field, and, in case no, querying the n values of the m key fields and determining numbers (y1 to ym) of different values (Val__1.1 to Val_m.ym) of the key fields 1 to m; and, with the lock service module, determining consecutively from a first to i-th field where i<=m until y1* . . . *yi>=k and, in case the condition is satisfied, creating one or more lock objects comprising the names of the key fields 1 to m and values Val__1.1 to Val_(i–1).y(i–1) for the key fields 1 to i–1 and comprising wildcards for the remaining key fields.

The data objects may then be locked according to the created lock objects. The exemplary method can be used to optimize the locks in a generic way and thus replace existing ones, resulting in a better maintainability of the system.

Embodiments of the present invention are further directed to computer systems, computer programs, computer readable media and carrier signals, each comprising program code or instructions for locking data sets in accordance with the above-described method.

Computer programs consistent with the invention can be installed as one or more programs or program modules on different hardware systems (computers or computer systems), run separately and independently of each other, and in their entirety be capable of performing methods and features consistent with embodiments of the invention. Furthermore, the different systems may be connected or arranged in the form of a network to communicate with each other.

Additional objects, advantages and embodiments of the invention will be set forth in part in the description, or may be learned by practice of the invention. Objects and advantages of the embodiments of the invention can be realized and attained by means of the elements and combinations particularly pointed out in the appended claims.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate embodiments of the present invention and, together with the description, explain principles of the invention. In the drawings.

DETAILED DESCRIPTION

Figure 1:
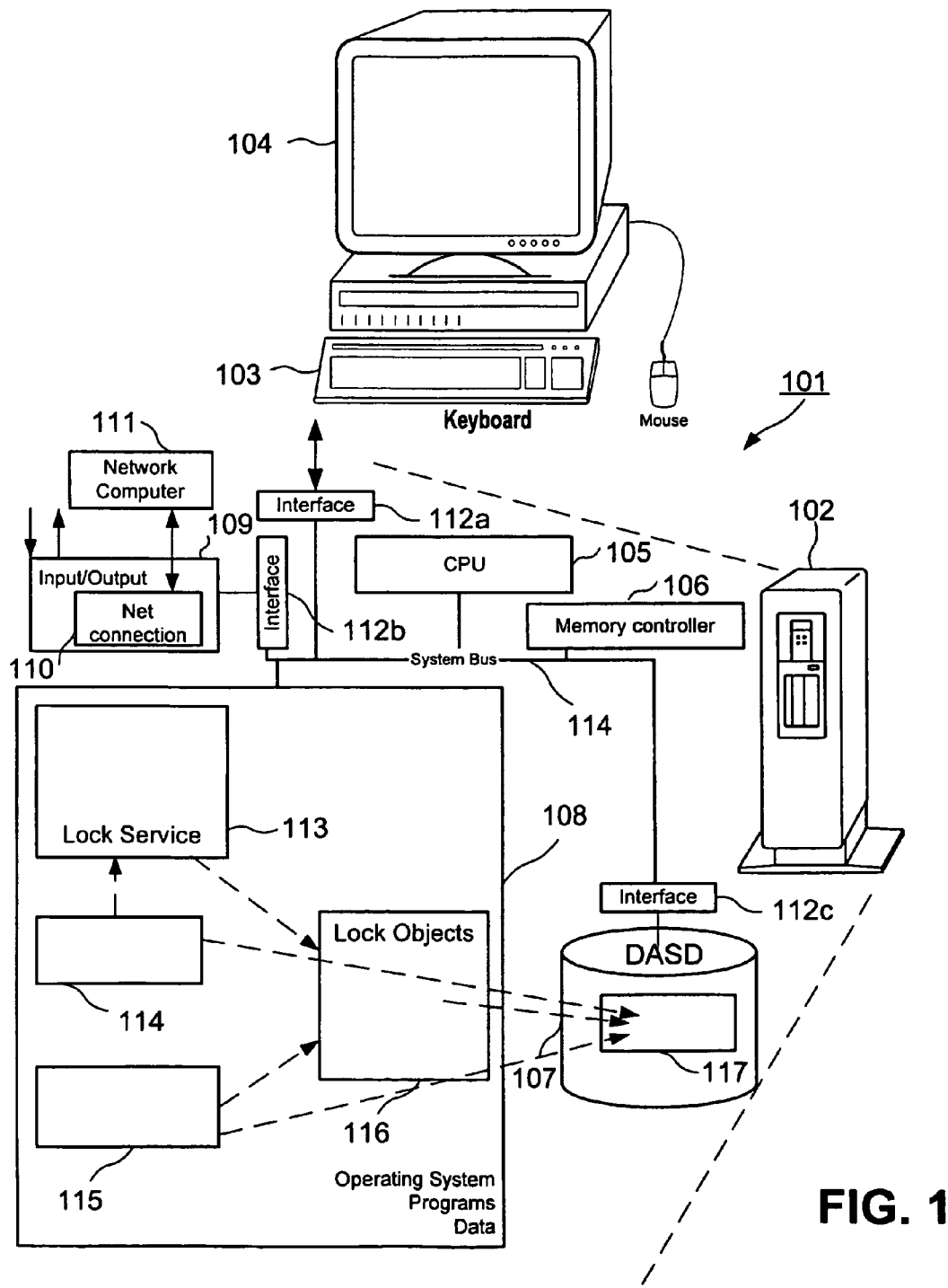
FIG. 1 is a block diagram of an exemplary computer system, consistent with an embodiment of the invention.

Reference will now be made in detail to exemplary embodiments of the invention illustrated in the accompanying drawings and described below. Wherever possible, the same reference numbers will be used throughout the drawings to refer to the same or like parts.

Within the concept of this specification, the terms used shall have their usual meaning in the context of the field of data processing unless defined otherwise. As used herein, a computer system broadly refers to any stand alone computer, such as a PC or a laptop or a series of computers connected via a network, e.g., a network within a company, or a series of computers connected via the Internet. Computer systems and programs are closely related. As used herein, phrases, such as "the computer provides", "the program provides or performs specific actions", and "a user performs a specific action" are used to express actions by a computer system that may be controlled by a program or to express that the program or program module may be designed to enable the computer system to perform a specific action or to enable a user to perform the specific action by means of a computer system. In this context, the term "automatically" is not intended to exclude a user's interactions with the computer system in the course of processing.

Methods consistent with the present invention may be implemented by means of computer systems and computer software, which allow the creation of business software applications and which allow the use of databases or database applications and Internet applications. Particularly, a lock object may be implemented as one or more lines of one or more tables in a database, such as a relational database. In object oriented programming languages, a lock object may be implemented as an instance of a class. The term data object broadly refers to any data in a database, which is identified by a key.

In one embodiment, methods consistent with the present invention may comprise determining one or more common characteristics of different values of a key field for the remaining key fields and writing the determined common characteristics and one or more wildcards into the remaining key fields of the or each lock object. A common characteristic may be a character string consisting of one or more consecutive characters of the characters forming the value. For example, in values like A1BC123, A2BC234, "A" and "BC" are common characteristics. Thus, A3BC345 may be replaced by A?BC*. In this case, "?" is a wildcard for a single character, and "*" is a wildcard for any number of characters.

Processors suitable for the execution of a computer program include, by way of example, both general and special purpose microprocessors, and anyone or more processors of any kind of digital computer. Generally, a processor will receive instructions and data from a read-only memory or a random access memory or both. The basic elements of a computer are a processor for executing instructions and one or more memory devices for storing instructions and data. Generally, a computer will also include or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-transitory computer-readable storage media, including by way of example, semiconductor memory devices, such as EPROM, EEPROM, and flash memory devices; magnetic disks, such as internal hard disks and removable disks, magneto-optical disks, and CD-ROM and DVD-ROM disks. The processor and the memory can be supplemented by, or incorporated in, application-specific integrated circuits (ASICs).

To provide for interaction with a user, embodiments of the invention can be implemented on a computer system having a display device such as a CRT (cathode ray tube) or LCD (liquid crystal display) for displaying information to the user, and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Referring now to FIG. 1, an exemplary computer system 101 is shown comprising a computer 102 and operating means 103, 104, in accordance with an embodiment of the present invention. Those skilled in the art will appreciate that embodiments consistent with the present invention apply equally to any computer system, regardless of whether the computer system is a complex multi-user computing apparatus or a single-user device, such as a personal computer or workstation.

Computer 102 may comprise a processor 105, main memory 108, a memory controller 106, an auxiliary storage interface 112c, a general input/output interface 112b and a terminal interface 112a, all of which are interconnected via a system bus 114.

Various modifications, additions, or deletions may be made to computer system 101 illustrated in FIG. 1, within the scope of the present invention, such as the addition of cache memory or other peripheral devices. FIG. 1 is presented to simply illustrate some of the salient features of computer system 101.

Processor 105 performs computation and control functions of computer system 101, and may comprise a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may suitably execute (object-oriented) computer programs within main memory 108.

Auxiliary storage interface 112c allows computer system 101 to store and retrieve information from auxiliary storage devices, such as magnetic disks (e.g., hard disks or floppy diskettes) or optical storage devices (e.g., CD-ROM). One suitable storage device is a direct access storage device (DASD) 107. As shown in FIG. 1, DASD 107 may be a hard disk drive which may read programs and data from a hard disk.

While the embodiment of FIG. 1 and other embodiments of the invention are described herein with reference to a fully functional computer system, those skilled in the art will appreciate that embodiments and features of the present invention may be distributed as a program product in a variety of forms, and that the present invention applies equally regardless of the particular type of signal bearing media to actually carry out the distribution. Further examples of signal bearing media include: recordable type media such as floppy disks and CD ROMS, and transmission type media, such as digital and analogous communication links, including wireless communication links.

Memory controller 106, through use of a processor is responsible for moving requested information from main memory 108 and/or through auxiliary storage interface 112c to processor 105. While for the purposes of illustration, memory controller 106 is shown as a separate entity, those skilled in the art understand that, in practice, portions of the function provided by memory controller 106 may actually reside in the circuitry associated with processor 105, main memory 108, and/or auxiliary storage interface 112c.

Terminal interface 112a allows system administrators and computer programmers to communicate with computer system 101, normally through monitor 104, keyboard 103, mouse, trackball and the like or through programmable workstations. Although the system 101 depicted in FIG. 1 contains only a single main processor 105 and a single system bus 114, it should be understood that embodiments of the present invention apply equally to computer systems having multiple processors and multiple system buses. Similarly, although the system bus 114 of a preferred embodiment is a typical hard-wired, multi-drop bus, any connection means that supports directional communication in a computer-related environment could be used.

Input/output interface 112b allows computer system 101 via processor 105 to communicate with general input/output means 109, including a net connection 110, for sending and/or receiving data, e.g. for a net connection with one or more further computer systems 111, or for sending or receiving of data to or from other parties. A plurality of computer systems like computer system 101, can be connected via the net connection 110 in the form of a network. In such a case, the network computers 111 can be used as further input/output means, including the use as further storage locations.

In one embodiment, memory 108 suitably includes an operating system, programs and data, particularly a lock service module 113 (lock service), a first processing module 114, a further processing module 115 and a lock object 116 for locking data objects in a database 117 available in DASD storage 107.

It should be understood that for purposes of this application, memory 108 is used in its broadest sense, and can include Dynamic Random Access Memory (DRAM), Static RAM (SRAM), flash memory, cache memory, etc. While not explicitly shown in FIG. 1, memory 108 may be a single type of memory component or may be composed of many different types of memory components. For example, memory 108 and CPU 105 may be distributed across several different computers that collectively comprise system 101. It should also be understood that programs in memory 108 can include any and all forms of computer programs, including source code, intermediate code, machine code, and any other representation of a computer program.

The operating system provides the basic functionality that controls the computer system 101. Operating system can comprise any suitable operating system, such as IBM's OS/400, OS/2, Microsoft's Windows, Java and the various flavors or editions of UNIX. The database 117 may provide the mechanism for persistently storing object data in the computer system 101, and can be any suitable database, including a relational database, such as those available from IBM, Oracle or Microsoft.

Those skilled in the art will appreciate that more than one of the mentioned processors may work in parallel in a computer system.

Figure 2:
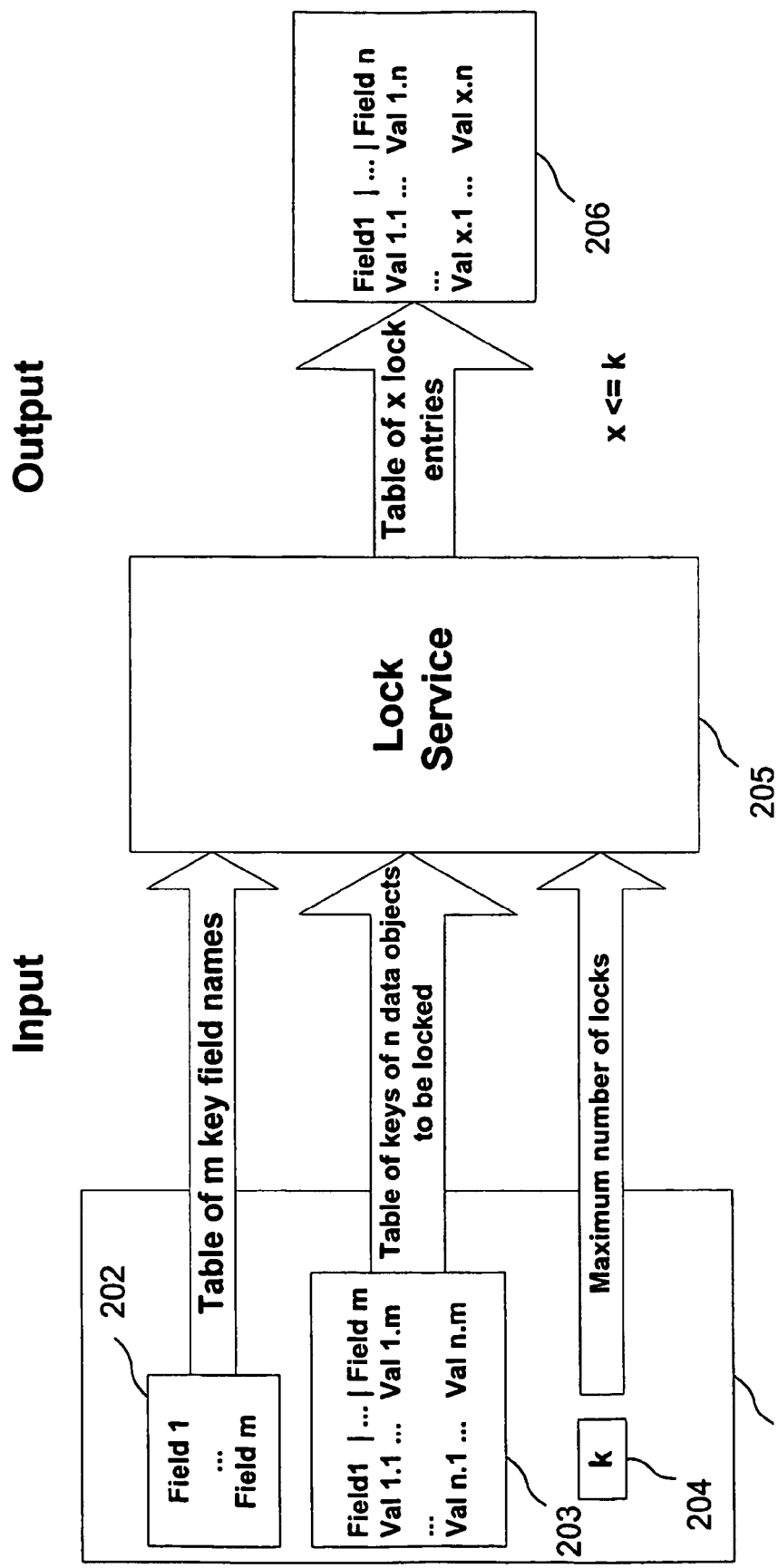
FIG. 2 is a block diagram for illustrating, by way of example, possible interactions between program modules and data, consistent with an embodiment of the invention.

Referring now to FIG. 2, a block diagram is provided for illustrating, by way of example, possible interactions between program modules and data, consistent with an embodiment of the invention. The example of FIG. 2 includes a first processing module 201, a lock service 205 and a lock object 206 located in a main memory of a computer system, like the one shown in FIG. 1. Before accessing one or more data objects in a database, processing module 201 passes the names of m key fields 202 of the n data objects to be locked, a table 203 of the values of the key fields for the n data objects to be locked, and a number 204 of the maximum number of locks (here k) to the lock service 205. Thereby, the names of the key fields have to be in an order, which fits to the structure of the database and the data objects to be locked. After processing the received data, lock service 205 generates a lock object 206 having x<=k entries for the n data objects. The entries comprise values for the x*m key fields that are used to lock the n data objects. If n is smaller or equal than k, a table (lock object) is returned, which comprises the n*m values of the n*m key fields, since the number of data keys does not exceed the possible number of locks and all data objects can be locked with their full key. Otherwise, if n greater than k, wildcards are used to lock several values for one key field at once. To determine where to use the wildcards, the lock service 205 may use a heuristic method to optimize the locks. According to such a heuristic method, lock service 205 may first collect all values that appear per key field. This may be implemented by means of a table, as shown by Table 1:

TABLE 1

Internal table of key field values

| Key Field | Number of different values | Value |
|---|---|---|
| Field 1 | Y1 | Val 1.1 |
|  |  | ... |
|  |  | Val 1.y1 |
| ... | ... | ... |
| Field m | ym | Val m.1 |
|  |  | ... |
|  |  | Val m.ym |

The first column contains the names of the key fields 1 to m. The second column contains a number y1 to ym of different values contained in the respective key field. The third column contains the different values val_1.1 to val_m.ym of the key fields 1 to m. Therefore, a field per key field is subdivided into a number of ym sub fields for a field m. The lock service 205 may then loop over the key fields and check, whether the number yi (i->1 to m) of different values is smaller than k. If yes, all the values for this key can be locked, if not, all key values are locked per wildcard. The method continues that way with the next key field considering, that the number of created lock entries is the product of the number of values per key field, which must not exceed k (k<=y1* ... *ym).

In one embodiment, Table 1 may be sorted according to ascending or descending values yi before the loop described above is performed.

The following tables shows by way of a non-limiting example how a lock object could look like. The example consists of a Table 2 defining m=3 key fields 1 to 3, a Table 3 defining keys of n=18 data objects to be locked and a maximum number of k=10 locks.

TABLE 2

Names of key fields

| Field No. | Name |
|---|---|
| 1 | Controlling Area |
| 2 | Activity |
| 3 | Branch |

TABLE 3

Keys of data objects to be locked

| Controlling Area | Activity | Branch |
|---|---|---|
| 1000 | Open Account | A1 |
| 1000 | Open Account | A2 |
| 1000 | Open Account | A3 |
| 1000 | Open Account | A4 |
| 1000 | Open Account | A5 |
| 1000 | Open Account | A6 |
| 1000 | Open Account | A7 |
| 1000 | Open Account | A8 |
| 1000 | Open Account | A9 |
| 1000 | Close Account | A1 |
| 1000 | Close Account | A2 |
| 1000 | Close Account | A3 |
| 1000 | Close Account | A4 |
| 1000 | Close Account | A5 |
| 1000 | Close Account | A6 |
| 1000 | Close Account | A7 |
| 1000 | Close Account | A8 |
| 1000 | Close Account | A9 |

These data are passed to the lock service 205 by processing module 201. After receipt, lock service 205 creates an internal table (Table 4 in the example) in order to determine a balanced number of locks containing wildcards.

TABLE 4

Internal table of key field values

| Key Field | Number of different values | Value |
|---|---|---|
| Controlling Area | 1 | 1000 |
| Activity | 2 | Open Account |
|  |  | Close Account |
| Branch | 9 | A1 |
|  |  | A2 |
|  |  | A3 |
|  |  | A4 |
|  |  | A5 |
|  |  | A6 |
|  |  | A7 |
|  |  | A8 |
|  |  | A9 |

Look service 205 then checks, whether n is smaller or equal than k. Since this is not the case in the example, lock service 205 loops over Table 4 starting with field 1: The number of values for that field is smaller than 10 and, therefore, all values for that field can be locked. Continuing with field 2, lock service 205 calculates the maximum number of lock entries for fields 1 and 2, which is 2 and is still smaller than 10 and, therefore, all values for fields 1 and 2 can be locked. Continuing with field 3, the analogous calculation yields a maximum number of 18 lock entries, which is greater than 10 and, therefore, the values for field 3 can not be locked and are replaced by wildcards. Consequently, lock service 205 creates a lock object having two entries. This can be seen in Table 5: the lock object comprises a table with a column for each key field. The values of key fields 1 and 2 are entered in the respective fields, whereas the values of the key field 3 is replaced by a wildcard (). As a result, the 18 data objects in the database represented by the keys in table 3, are locked with a lock object having two entries. Thus, the activities open/close account would be locked in controlling area 1000** for all branches. If a second process should try to get access to data objects with those activities and controlling area part in branches B1 to B2, for example, this would not be possible, because the wildcards cover these branches as well.

TABLE 5

Lock object having 2 entries

| Controlling Area | Activity | Branch |
|---|---|---|
| 1000 | Open Account | ** |
|  | Close Account | ** |

This situation may be improved by another embodiment of the invention according to which common characteristics of different values of a key field are determined and the determined common characteristics are entered together with a wildcard into the key fields. This is now explained in more detail by way of continuation of the preceding example.

When checking for common characteristics of the values of the key field 3, lock service 205 finds that the character 'A' is a common characteristic of all values of key field 3. This character can now be combined with a wildcard and the combination can be entered in state of the mere wildcard into the fields of key field 3. The result is shown in Table 6.

Now a second process could have access to those activities in the branches B1 to B9 at the same time.

TABLE 6

Lock object having 2 complete entries in the first 2 key fields and a common characteristic together with a wildcard in the remaining key field

| Controlling Area | Activity | Branch |
|---|---|---|
| 1000 | Open Account | A* |
|  | Close Account | A* |

Figure 3:
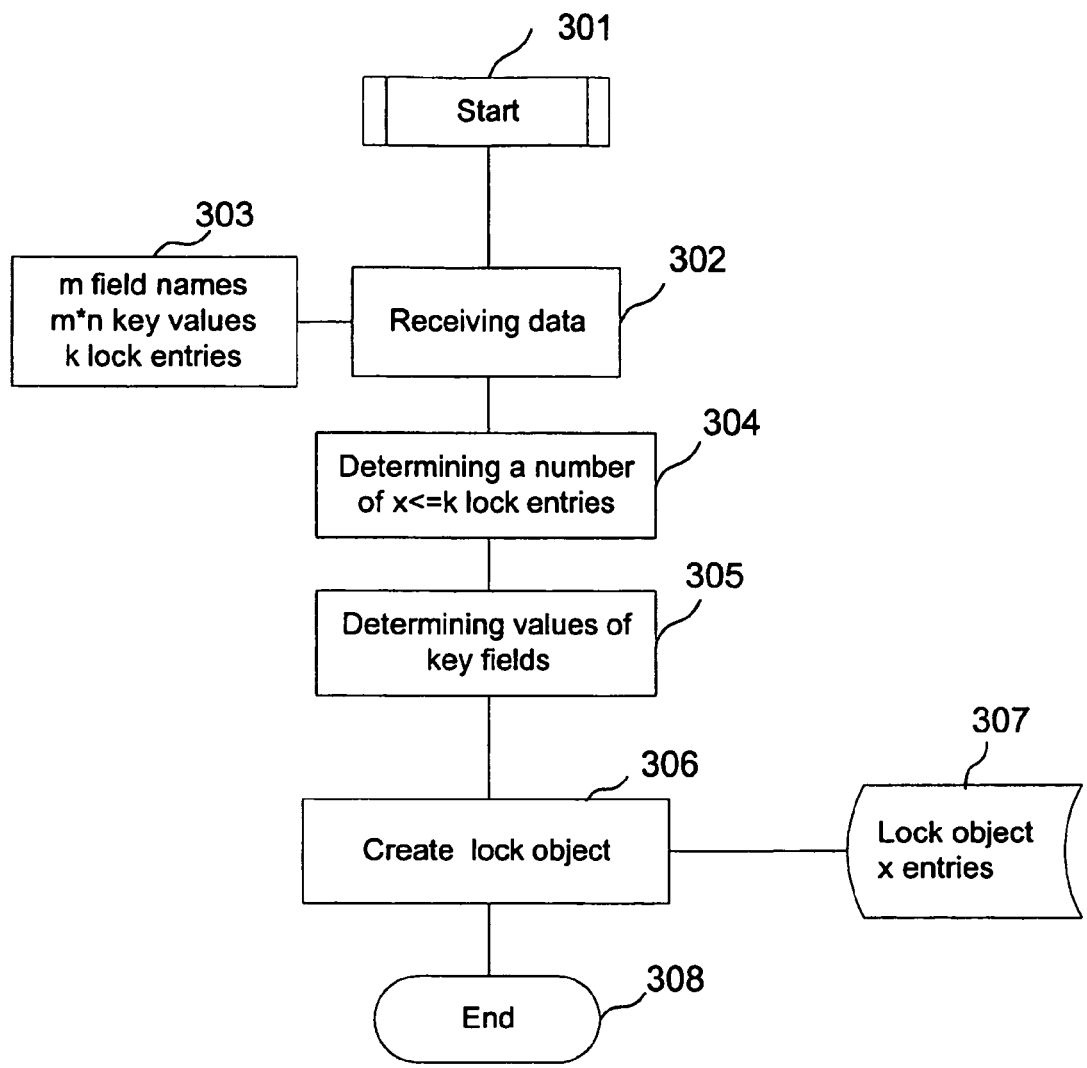
FIG. 3 is a flow diagram for illustrating an exemplary method, consistent with an embodiment of the invention.

Referring now to FIG. 3, a further embodiment of the invention is illustrated by way of a flow diagram of an exemplary method for a lock service module. As shown in FIG. 3, after a starting step 301, the lock service receives data from a data processing module 303 in step 302. The data comprise m field names, m*n values of key fields for the n data objects to be locked and a maximum number of k lock entries. The lock service then determines in step 304 an optimized number of x<=k lock entries, for example, by creating and evaluating an internal table like Table 4 described before. The lock service then determines in step 305 whether values or wildcards are entered into the fields of the x entries of a lock object 307 to be created in step 306. The process then returns to step 302 and waits for a new lock request or ends in step 308.

Modifications and adaptations of the invention will be apparent to those skilled in the art from consideration of the specification and practice of the embodiments of the invention disclosed herein. The foregoing description of embodiments and exemplary features of the invention has been presented for purposes of illustration and description. It is not exhaustive and does not limit embodiments of the invention to the precise forms disclosed. Modifications and variations are possible in light of the above teachings or may be acquired from the practicing embodiments of the invention. For example, the described implementations include software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM, the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of embodiments of the invention disclosed herein. It is intended that the specification and examples be considered as exemplary only, with a true scope and spirit of the invention being indicated by the following claims.

What is claimed is:

1. A computer-implemented method for locking data objects in a computer system, the data objects including a plurality of key fields, the method comprising:
   determining whether a number of the data objects to be locked is less than or equal to a maximum number of locks, wherein the data objects are stored in memory of the computer and the maximum number is greater than 0;
   creating, when the number of the data objects to be locked is less than or equal to the maximum number of locks, a plurality of lock objects comprising names and values for the key fields; and
   creating, when the number of the data objects to be locked is greater than the maximum number of locks, a plurality of lock objects comprising names and values for the key fields by applying a heuristic process such that the one or more lock objects include a wildcard value for a key field;
   the heuristic process including:

determining a quantity of different values for the data objects by consecutively determining a quantity of different values for one or more of the key fields until the quantity of different values for one or more of the key fields is greater than the maximum number of locks;

determining, when the quantity of the different values for the data objects is greater than the maximum number of locks, a common characteristic of the values of a key field;

creating a combination value based on a combination of the common characteristic and a wildcard value; and writing the combination value into a key field of a created lock object.

2. The computer-implemented method of claim 1, wherein determining a quantity of different values for the data objects further comprises:

consecutively multiplying the quantity of different values for the key fields until the product of the quantity of different values for the key fields is greater than the maximum number of locks.

3. The computer-implemented method of claim 2, wherein applying the heuristic process further comprises creating, when the quantity of the different values is less than the maximum number of locks, one or more lock objects comprising the names and values of the key fields.

4. The computer-implemented method of claim 1 further comprising storing, in a database table, the plurality of key fields, the names corresponding to the key fields, and the different values corresponding to the plurality of key fields and the names.

5. The computer-implemented method of claim 1, wherein the different values of the key fields are determined to have a common characteristic when at least two of the different values include a same alphabet, number, or character.

6. The computer-implemented method of claim 1 further comprising creating lock objects comprising the names and the different values to lock all the data objects when the number of data objects to be locked is determined to be less than or equal to the maximum number of locks.

7. A computer system for locking data objects, the data objects including a plurality of key field, the computer system comprising:

a memory device storing program instructions and the data objects; and a data processor executing the program instructions to cause the computer system to:

determine whether a number of the data objects to be locked is less than or equal to a maximum number of locks, wherein the maximum number is greater than 0;

create, when the number of the data objects to be locked is less than or equal to the maximum number of locks, a plurality of lock objects comprising names and values for the key fields; and create, when the number of the data objects to be locked is greater than the maximum number of locks, a plurality of lock objects comprising names and values for the key fields by applying a heuristic process such that the one or more lock objects include a wildcard value for a key field;

the heuristic process including:

determining a quantity of different values for the data objects by consecutively determining a quantity of different values for one or more of the key fields until the quantity of different values for one or more of the key fields is greater than the maximum number of locks;

determining, when the quantity of the different values for the data objects is greater than the maximum number of locks, a common characteristic of the values of a key field;

creating a combination value based on a combination of the common characteristic and a wildcard value; and writing the combination value into a key field of a created lock object.

8. The computer system of claim 7, wherein determining a quantity of different values for the data objects further comprises:

consecutively multiplying the quantity of different values for the key fields until the product of the quantity of different values for the key fields is greater than the maximum number of locks.

9. The system of claim 8, wherein applying the heuristic process further comprises creating, when the quantity of the different values is less than the maximum number of locks, one or more lock objects comprising the names and values of the key fields.

10. The computer system of claim 7, wherein the memory device stores, in a database table, the plurality of key fields, the names corresponding to the key fields, and the different values corresponding to the plurality of key fields and the names.

11. The computer system of claim 7, wherein the different values of the key fields are determined to have a common characteristic when at least two of the different values include a same alphabet, number, or character.

12. The computer system of claim 7, wherein the data processor further causes the computer system to create lock objects comprising the names and the different values to lock all the data objects when the number of data objects to be locked is determined to be less than or equal to the maximum number of locks.

13. A non-transitory computer readable storage medium, the storage medium comprising program instructions which, when executed on a processor, cause the processor to perform a method for locking data objects in a computer system, the data objects including a plurality of key fields, the method comprising:

determining whether a number of the data objects to be locked is less than or equal to a maximum number of locks, wherein the data objects are stored in memory of the computer and the maximum number is greater than 0;

creating, when the number of the data objects to be locked is less than or equal to the maximum number of locks, a plurality of lock objects comprising names and values for each of the key fields; and creating, when the number of the data objects to be locked is greater than the maximum number of locks, a plurality of lock objects comprising names and values for the key fields by applying a heuristic process such that the one or more lock objects include a wildcard value for a key field;

the heuristic process including:

determining a quantity of different values for the data objects by consecutively determining a quantity of different values for one or more of the key fields until the quantity of different values for one or more of the key fields is greater than the maximum number of locks;

determining, when the quantity of the different values for the data objects is greater than the maximum number of locks, a common characteristic of the values of a key field;

creating a combination value based on a combination of the common characteristic and a wildcard value; and writing the combination value into a key field of a created lock object.

14. The computer readable storage medium of claim 13, wherein determining a quantity of different values for the data objects further comprises:

consecutively multiplying the quantity of different values for the key fields until the product of the quantity of different values for the key fields is greater than the maximum number of locks.

15. The computer readable storage medium of claim 14, wherein applying the heuristic process further comprises creating, when the quantity of the different values is less than the maximum number of locks, one or more lock objects comprising the names and values of the key fields.

16. The computer readable storage medium of claim 13, wherein the method further comprises storing, in a database table, the plurality of key fields, the names corresponding to the key fields, and the different values corresponding to the plurality of key fields and the names.

17. The computer readable storage medium of claim 13, wherein the different values are determined to have a common characteristic when at least two of the different values include a same alphabet, number, or character.

18. The computer readable storage medium of claim 13, wherein the method further comprises creating lock objects comprising the names and the different values to lock all the data objects when the number of data objects to be locked is determined to be less than or equal to the maximum number of locks.

* * * * *